May 28, 1957 K. K. HORNER 2,794,139
CONNECTOR FOR A MOTOR BRUSH HOLDER
Filed July 2, 1954
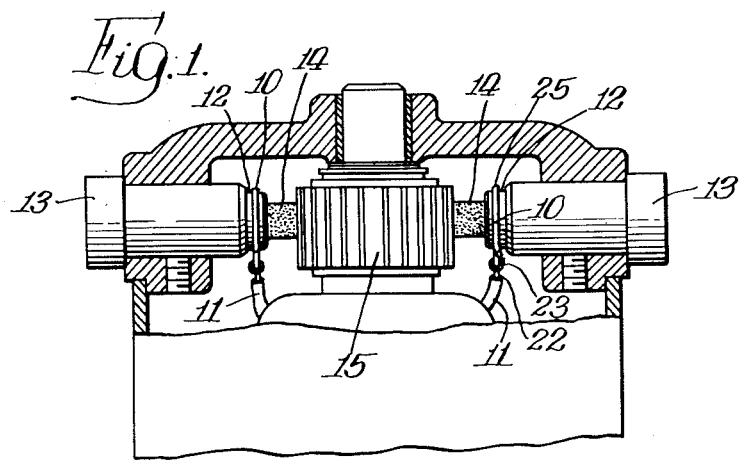
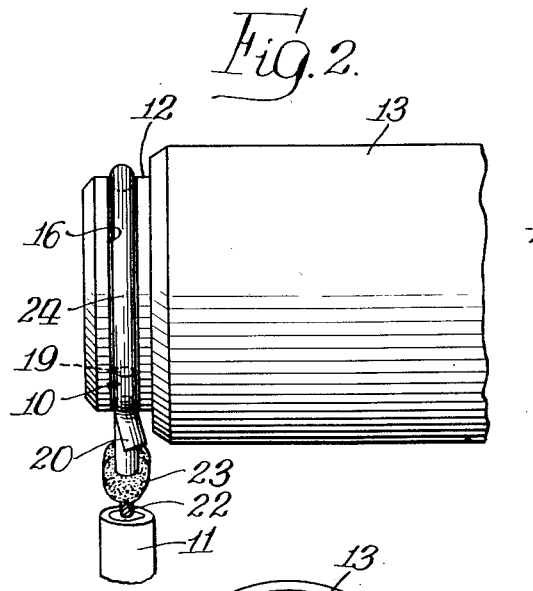
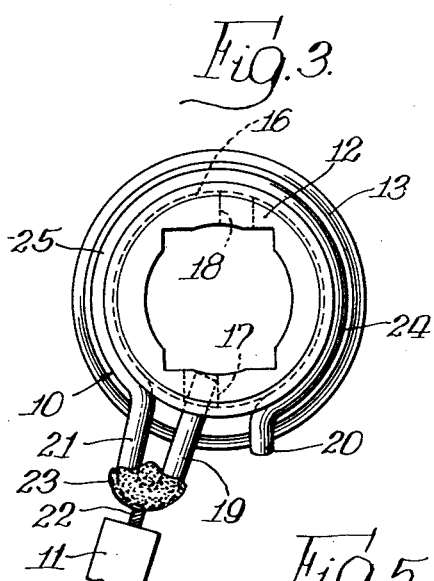
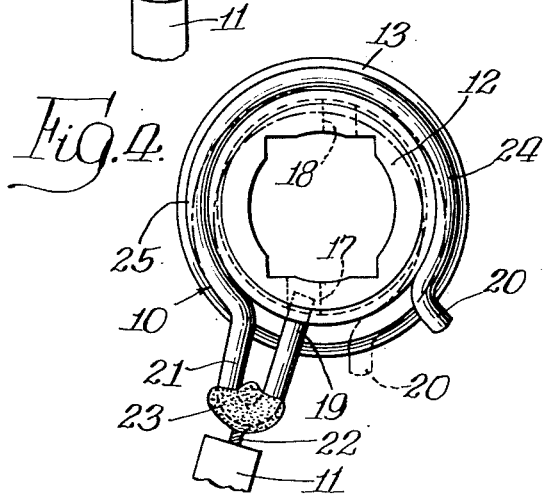
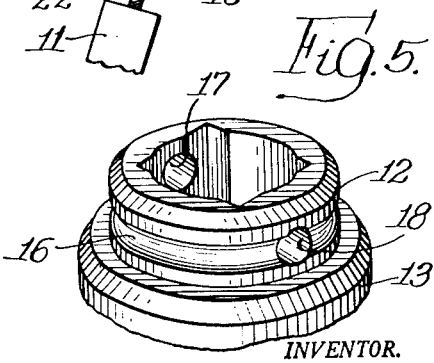
INVENTOR.
Kenneth K. Horner,
BY Schroeder, Hofgren,
Brady & Wegner. Attys.

United States Patent Office 2,794,139
Patented May 28, 1957

2,794,139

CONNECTOR FOR A MOTOR BRUSH HOLDER

Kenneth K. Horner, Chicago, Ill., assignor to Birtman Electric Company, a corporation of Illinois Application July 2, 1954, Serial No. 441,088

4 Claims. (Cl. 310—239)

This invention relates to an electric lead clip connector for making electrical contact in confined spaces with electrical devices such as motor brush holders.

In the use of electrical equipment such as motors, it is frequently desirable to utilize lead connectors which must be inserted into restricted or confined spaces. The problem is particularly pronounced in the construction or repair of small, compact electric motors such as sewing machine motors and the like where internal brush holder motor leads are used. Installation or replacement of such a lead if soldered or otherwise permanently connected not only is difficult but time consuming.

I have invented a detachable clip connector which may be easily snapped into or out of position around the periphery of a receiving conductor. In one embodiment, a piece of spring wire is formed into a loop having the two ends of the wire spaced apart, the wire being shaped at a point intermediate its ends into an eye for receiving a lead wire, one of the ends being directed inwardly of the loop which, when engageable with the shoulders defining a hole in the periphery of a supporting conductor, acts as a pivot so that the loop or clip may be snapped over the end of the supporting conductor to make electrical contact therewith. The loop of the wire preferably normally lies in a groove around the conductor to make a tight electrical contact therewith.

The invention will be described as related to the embodiment shown in the accompanying drawings, of which:

Fig. 1 is a fragmentary sectional view of part of a motor showing the clip connecting motor leads to both the commutator brush holders.

Fig. 2 is a fragmentary side elevational view of a brush holder with the brush omitted, but having the clip connector fastened thereto.

Fig. 3 is an end elevational view looking at the left hand end of the structure shown in Fig. 2.

Fig. 4 is a view similar to Fig. 3, but showing one position of clip during the attachment thereof to the brush holder.

Fig. 5 is a fragmentary perspective view of the brush holder.

In the embodiment of the invention shown in the drawings, a pair of clip connectors 10 each carrying a motor lead 11 are connected to the conducting portions 12 of a brush holder 13. These brush holders support spring urged brushes 14 in contact with the commutator 15 of a series motor. The holders are of a conventional type except, as shown in Fig. 2, each of the conducting portions 12 is provided with a shallow circumferential annular groove 16. A pair of opposed openings 17 and 18 are provided in the portion 12 each intersecting the groove 16.

The connector clip 10 comprises a piece of stiff wire having the characteristics of spring wire and bent to form an inwardly directed prong 19 at one end lying substantially on a diameter of the loop of the clip and an outwardly directed curved prong 20 on the other end of the clip. The two prongs 19 and 20 are spaced apart so that the two are sprung toward and away from each other in connecting and disconnecting the clip. The base of prong 19 is shaped as a loop 21 for connection with the end 22 of an insulated wire 11 as by a soldered joint 23.

When disengaged from the brush holder, the prongs are spaced apart and the arcuate portion 24 describes an arc of a circle having a diameter less than that of the groove 16. Thus the clip lies securely within the groove after being expanded to make the connection.

When attaching the clip to a brush holder end 12 the brush 14 is either removed or retracted so that the clip may pass over this end. In attaching the clip prong 19 is inserted into one of the holes 17 and 18 in the manner illustrated in Fig. 4. This prong is then pushed into the hole as far as it will go, at which time the arcuate portion 24 of the clip bears against the adjacent portion of the annular groove 16. The opposite side of this arcuate portion is then snapped over the end of the brush holder portion 12 and into the groove 16 to occupy the position shown most clearly in Figs. 2 and 3.

In the above action the inwardly extended prong 19 entering the hole 17 or 18 serves to locate the clip properly with respect to the brush holder. When this prong 19 is inserted to its maximum extent, the clip is automatically positioned properly for passing around the end of the brush holder and snapping into the groove 16. The natural springiness of the clip holds the clip firmly in engagement with the brush holder and the engagement of the prong 19 with its hole prevents rotational movement of the clip with respect to the brush holder. The opposite end 20 of the clip extends away from the brush holder, as is shown most clearly in Fig. 4, and this end may be grasped in removing the clip from the brush holder. In this removal the above series of motions is merely reversed.

With the construction as shown and described, the clip may be easily moved into electrical engagement with the brush holder even when working in confined spaces such as within the casing of a small motor. Furthermore, the operator need not see what he is doing as it is only necessary to first engage the prong 19 with the groove 16 which may easily be done without seeing the groove. Then the prong 19 is moved along the groove until it engages a hole 17 or 18. As soon as this occurs it is only necessary to move the prong inwardly at its greatest extent and snap the clip around the end of the brush holder and into the groove 16.

The number of holes in the annular groove 16 is not critical and while two are shown to permit a connection to be made with the hook 19 engageable in either hole and from either side of the brush holder, any number may be utilized.

Having described my invention as related to the embodiment shown in the drawings, it is my intention that the invention be not limited by any of the details of description, unless otherwise specified, but rather be construed broadly within its spirit and scope as set out in the accompanying claims.

I claim:

1. In an electrical motor, an electrical circuit therefor, comprising: an electrical conducting tubular member adapted to contain a motor brush, the member having a recessed portion adjacent to one end thereof; a wire clip adapted partially to embrace a portion of the outer surface of the brush holder to make electrical contact therewith, the clip having an inturned prong normally held in said recessed portion and an arcuate spring part extending from a point adjacent to the prong in an arc of less than 360° snappable into engagement with the part of the holder opposite to the recessed portion after the prong has engaged the recessed portion to grasp the holder securely; and an electrical lead connected to said clip.

2. The apparatus of claim 1 wherein said tubular member is provided with an annular groove intersected by said recessed portion and in which said clip normally lies.

3. In an electrical motor, an electrical circuit therefor, comprising: a brush holder member adapted to make electrical contact with a motor brush, the member having a recessed portion therein; a wire clip adapted partially to embrace a portion of the outer surface of the brush holder member to make electrical contact therewith, the clip having an inturned prong normally held in said recessed portion and an arcuate spring part adjacent to said prong extending in an arc of more than 180° snappable into engagement with said member after the prong has engaged the recessed portion to grasp the member securely; and an electrical lead connected to said clip.

4. The circuit of claim 3 wherein said arc is less than 360°.

References Cited in the file of this patent

UNITED STATES PATENTS

| | | |
|---|---|---|
| 767,846 | Steinberger | Aug. 16, 1904 |
| 984,561 | Hochhausen | Feb. 21, 1911 |
| 1,960,470 | Whiteside | May 29, 1934 |
| 2,239,812 | Urzaiz | Apr. 29, 1941 |
| 2,454,230 | Stickney | Nov. 16, 1948 |